(12) United States Patent  (10) Patent No.: US 8,452,739 B2
Jain et al.  (45) Date of Patent: May 28, 2013

(54) HIGHLY SCALABLE AND DISTRIBUTED DATA DE-DUPLICATION

(75) Inventors: Sanjay Jain, Northborough, MA (US); Puneesh Chaudhry, Northbridge, MA (US)

(73) Assignee: Copiun, Inc., Northborough, MA (US)

( * ) Notice: Subject to any disclaimer, the term of this patent is extended or adjusted under 35 U.S.C. 154(b) by 65 days.

(21) Appl. No.: 13/049,095

(22) Filed: Mar. 16, 2011

(65) Prior Publication Data

US 2011/0231374 A1   Sep. 22, 2011

Related U.S. Application Data

(60) Provisional application No. 61/314,293, filed on Mar. 16, 2010.

(51) Int. Cl.
*G06F 17/30* (2006.01)

(52) U.S. Cl.
USPC ............ 707/692; 707/697; 707/737; 707/758

(58) Field of Classification Search
USPC ...................................................... 707/692
See application file for complete search history.

(56) References Cited

U.S. PATENT DOCUMENTS

| | | | |
|---|---|---|---|
| 5,590,810 A | 1/1997 | Wehbi | |
| 5,873,104 A | 2/1999 | Tremblay et al. | |
| 5,990,810 A | 11/1999 | Williams | |
| 6,065,046 A | 5/2000 | Feinberg et al. | |
| 6,526,493 B1 | 2/2003 | Ding | |
| 6,704,730 B2 | 3/2004 | Moulton et al. | |
| 6,742,081 B2 | 5/2004 | Talagala et al. | |
| 6,941,436 B2 | 9/2005 | Lee et al. | |
| 6,959,291 B1 | 10/2005 | Armstrong et al. | |
| 6,976,146 B1 | 12/2005 | Aiello et al. | |
| 7,051,180 B2 | 5/2006 | Downer et al. | |
| 7,065,619 B1 | 6/2006 | Zhu et al. | |
| 7,272,602 B2 | 9/2007 | Moulton | |
| 7,305,532 B2 | 12/2007 | Zhu et al. | |
| 7,373,464 B2 | 5/2008 | Zhu et al. | |
| 7,430,616 B2 | 9/2008 | Husain et al. | |
| 7,472,242 B1 | 12/2008 | Deshmukh et al. | |
| 7,477,166 B2 | 1/2009 | McCanne et al. | |

(Continued)

FOREIGN PATENT DOCUMENTS

| | | |
|---|---|---|
| KR | 10-2004-0091392 A | 10/2004 |
| WO | WO-2009/087028 | 7/2009 |

(Continued)

OTHER PUBLICATIONS

International Search Report and Written Opinion of the International Searching Authority, the Korean Intellectual Property Office, for International Application No. PCT/US2011/028318, date of mailing Sep. 27, 2011, 7 pages.

(Continued)

*Primary Examiner* — Binh V Ho

(74) *Attorney, Agent, or Firm* — Oblon, Spivak, McClelland, Maier & Neustadt, L.L.P.

(57) ABSTRACT

This disclosure relates to systems and methods for both maintaining referential integrity within a data storage system, and freeing unused storage in the system, without the need to maintain reference counts to the blocks of storage used to represent and store the data.

18 Claims, 4 Drawing Sheets

U.S. PATENT DOCUMENTS

| | | | |
|---|---|---|---|
| 7,504,969 B2 | 3/2009 | Patterson et al. | |
| 7,562,186 B2 | 7/2009 | Li et al. | |
| 7,590,644 B2 | 9/2009 | Matsakis et al. | |
| 7,624,335 B1 | 11/2009 | Maheshwari et al. | |
| 7,860,843 B2 | 12/2010 | Dodd et al. | |
| 7,925,683 B2 | 4/2011 | Jain et al. | |
| 7,979,569 B2 | 7/2011 | Eisner et al. | |
| 2002/0169972 A1 | 11/2002 | Tanaka et al. | |
| 2003/0131154 A1 | 7/2003 | Downer et al. | |
| 2003/0212873 A1 | 11/2003 | Lee et al. | |
| 2004/0073835 A1 | 4/2004 | Kim | |
| 2004/0091392 A1 | 5/2004 | McBride et al. | |
| 2004/0139097 A1 | 7/2004 | Farber et al. | |
| 2005/0050459 A1 | 3/2005 | Qu et al. | |
| 2005/0216669 A1 | 9/2005 | Zhu et al. | |
| 2006/0047855 A1 | 3/2006 | Gurevich et al. | |
| 2006/0059171 A1 | 3/2006 | Borthakur et al. | |
| 2006/0069719 A1 | 3/2006 | McCanne et al. | |
| 2006/0069733 A1 | 3/2006 | Antonoff et al. | |
| 2006/0109909 A1 | 5/2006 | Chang et al. | |
| 2006/0206669 A1 | 9/2006 | Zhu et al. | |
| 2006/0212439 A1 | 9/2006 | Field | |
| 2007/0028110 A1 | 2/2007 | Brennan | |
| 2007/0061544 A1 | 3/2007 | Uppala | |
| 2007/0143359 A1 | 6/2007 | Uppala | |
| 2007/0239945 A1 | 10/2007 | Li et al. | |
| 2007/0239946 A1 | 10/2007 | Zhu | |
| 2008/0013830 A1 | 1/2008 | Patterson et al. | |
| 2008/0050025 A1 | 2/2008 | Bashyam et al. | |
| 2008/0050026 A1 | 2/2008 | Bashyam et al. | |
| 2008/0050027 A1 | 2/2008 | Bashyam et al. | |
| 2008/0050029 A1 | 2/2008 | Bashyam et al. | |
| 2008/0050047 A1 | 2/2008 | Bashyam et al. | |
| 2008/0082525 A1 | 4/2008 | Cha et al. | |
| 2008/0133835 A1 | 6/2008 | Zhu et al. | |
| 2008/0159331 A1 | 7/2008 | Mace et al. | |
| 2008/0183767 A1 | 7/2008 | Zhu et al. | |
| 2008/0256143 A1 | 10/2008 | Reddy et al. | |
| 2008/0270729 A1 | 10/2008 | Reddy et al. | |
| 2008/0281908 A1 | 11/2008 | McCanne et al. | |
| 2008/0294660 A1 | 11/2008 | Patterson et al. | |
| 2008/0320106 A1 | 12/2008 | McCanne et al. | |
| 2008/0320151 A1 | 12/2008 | McCanne et al. | |
| 2009/0063528 A1 | 3/2009 | Yueh | |
| 2009/0063795 A1 | 3/2009 | Yueh | |
| 2009/0079597 A1 | 3/2009 | McCanne et al. | |
| 2009/0083563 A1* | 3/2009 | Murase | 713/324 |
| 2009/0216774 A1 | 8/2009 | Rao et al. | |
| 2009/0216788 A1 | 8/2009 | Rao et al. | |
| 2009/0240718 A1 | 9/2009 | Rao et al. | |
| 2009/0265397 A1 | 10/2009 | Williams | |
| 2009/0287725 A1 | 11/2009 | Von Praun | |
| 2009/0287874 A1* | 11/2009 | Rogers et al. | 711/103 |
| 2009/0289819 A1 | 11/2009 | Mahoney | |
| 2009/0327625 A1* | 12/2009 | Jaquette et al. | 711/160 |
| 2010/0042790 A1* | 2/2010 | Mondal et al. | 711/161 |
| 2010/0161608 A1 | 6/2010 | Jain et al. | |
| 2010/0161685 A1 | 6/2010 | Jain et al. | |
| 2011/0016091 A1* | 1/2011 | Prahlad et al. | 707/654 |
| 2011/0145207 A1* | 6/2011 | Agrawal et al. | 707/692 |
| 2011/0225129 A1* | 9/2011 | Agrawal | 707/692 |
| 2011/0225141 A1 | 9/2011 | Chaudhry et al. | |

FOREIGN PATENT DOCUMENTS

| | | |
|---|---|---|
| WO | WO-2010/080591 | 7/2010 |
| WO | WO-2011/113042 | 9/2011 |
| WO | WO-2011/116087 | 9/2011 |

OTHER PUBLICATIONS

International Search Report and Written Opinion of the International Searching Authority the Korean Intellectual Property Office for PCT/US2009/068687, mailing date of Aug. 3, 2010, 7 pages.

International Search Report and Written Opinion of the International Searching Authority, the Korean Intellectual Property Office, for International Application No. PCT/US2011/028656, dated Oct. 26, 2011, 6 pages.

* cited by examiner

HIGHLY SCALABLE AND DISTRIBUTED DATA DE-DUPLICATION

CROSS-REFERENCE TO RELATED APPLICATIONS

This application claims priority to U.S. Provisional Application 61/314,293 filed Mar. 16, 2010, the entire contents of which are incorporated herein by reference. This disclosure is also related to the disclosure in U.S. patent application Ser. No. 12/642,023, filed Dec. 18, 2009 and published as U.S. Publication No. 2010/0161608 A1, which is incorporated herein by reference.

FIELD OF THE DISCLOSURE

This disclosure relates to data management systems, and more specifically to maintaining referential integrity in such systems.

BACKGROUND

Modern computer systems hold vast quantities of data that is increasing rapidly; so rapidly, in fact, that in many cases the increase threatens to outstrip the capacity of storage systems. This growth not only needs a continuing investment in newer and bigger storage systems, it also requires a corresponding increase in the cost of managing those systems. It is highly desirable to decrease the amount of storage within a company, as the storage can significantly reduce the capital and operational expenditure of a company.

One characteristic of the data stored in most mass storage systems is that there is a tremendous amount of duplication of data. Examples include duplicate files, files that are slightly different (e.g. multiple drafts of the document), same images being stored in multiple documents, same templates or stationery being applied to presentations etc. While there are some systems that can detect identical files and store them only once, typical systems still require storing large amount of duplicate data. For example, practically every document in a company has the company logo embedded within it, but today's storage techniques are unable to recognize that the same data for the logo is being repeated in every document and are unable to save on storage for that.

There is increased emphasis on sub-file data de-duplication to detect duplicate data at a sub-file level to reduce the storage and network footprint for primal storage as well as secondary storage uses like backup and archive. In recent times, various systems have been designed that can detect duplicate data at sub-file level. De-duplication systems typically create one or more 'chunks' out of the file or block storage unit being analyzed for de-duplication and then employ one or more methods of comparison to detect whether a duplicate chunk has been produced.

OVERVIEW

Figure 1:
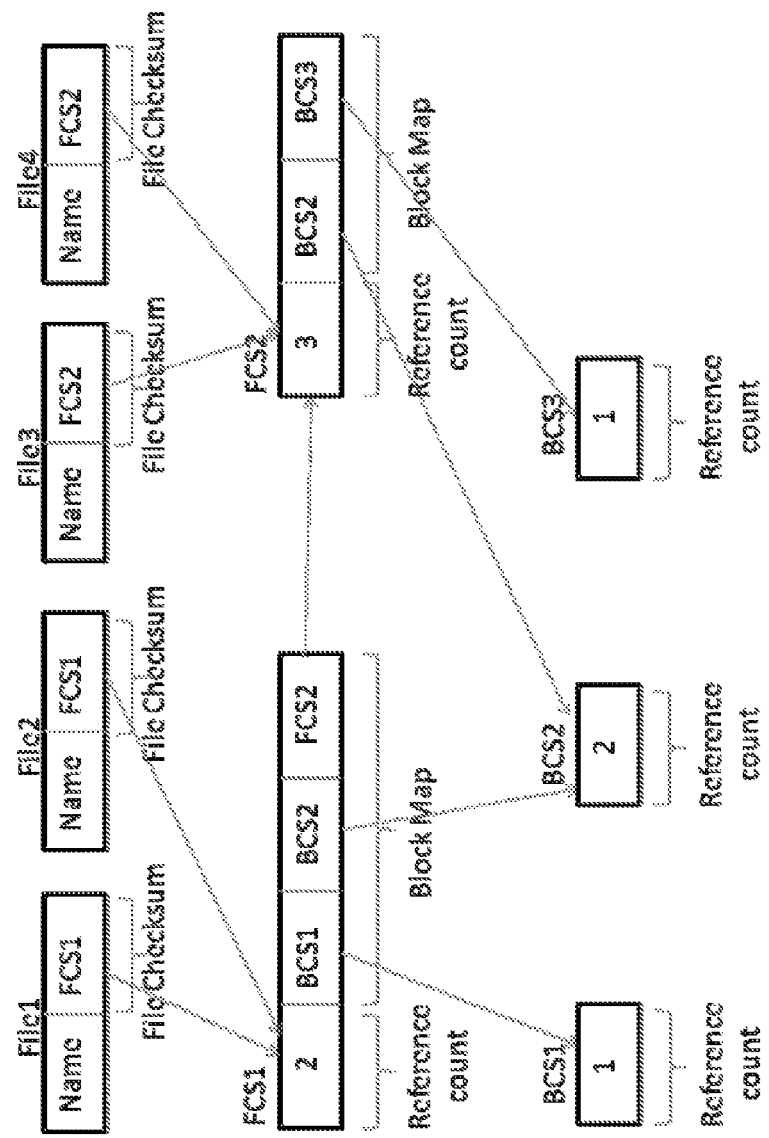
FIG. 1 illustrates a method of maintaining reference counts to remove unreferenced blocks from a data de-duplication system in accordance with some embodiments.

One issue involved with representing data in a storage system as chunks is how to manage removing chunks that are no longer needed to represent any of the data stored in the system. Considerations when removing chunks include determining when non-referenced (non-used) chunks exist, when to free the storage associated with non-referenced chunks, and how to remove the non-referenced chunks in a manner that does not unduly detract from the system's performance.

As described in the text and figures of the incorporated U.S. Publication No. 2010/0161608 A1, representing data in a storage system as chunks can include one or more of the following steps applied to create chunks from a given piece of digital data (whether file, block, BLOB, or stream based) that needs to be de-duplicated:

1. Break or "Chunk" the given digital data into "whole" logical objects by applying the knowledge about various formats of storing or transmitting digital data. For example, an image in a document would be a "whole" logical object stored in a format specific to the said document. File formats include examples such as .ppt, .doc, .xls, .pptx, .docx, .xlsx, .pdf, .xml, .cpp, .one, .mdb, and .a formats.
2. Handle "Broken" Objects: assemble the logical object if it is physically not on contiguous storage/stream blocks. Sometimes while storing a logical object it can be broken into many small sub-objects that can be scattered across multiple storage blocks. In this case, the logical object is formed after identifying, all such sub-objects and assembling them in the correct order.
3. Remove any format specific transformations applied to the logical object. For example, if the logical object is stored in a compressed format within a storage unit then that logical object is un-compressed first before using it as a chunk for de-duplication. Similarly if the logical object is stored as encrypted then that logical object is decrypted before using it as a chunk for de-duplication.
4. Remove any format specific headers/footers attached to the logical objects. Most digital data formats either precede the logical object with a header or append a footer as part of or after inserting the logical object into the said digital data.
5. Remove any position specific data and metadata from the logical block. Many digital data formats store positional data within or around the logical data, e.g. slide numbers in a PowerPoint document.
6. If the object happens to be the file object, then assemble the file object first and then extract the logical objects using above steps. This allows one to find same objects e.g. image within a file object embedded in the compound files formats like .PST/.ZIP.

After the above one or more steps, what is left is a logical object in a native form that is independent of format specific transformations, embedded positional data, surrounding metadata, or effects of the object having been broken into multiple sub-objects for storage purposes. Operating on the logical object in its native form obtained using the methods described above enables one to find duplicate chunks of the data across even unrelated files. It is possible that only one or more steps are applied when identifying the chunk. Some objects may use different steps, and the particular steps used may be dependent on the file type and object type.

Partitioning digital data into chunks may include creating a map, such as a block map, that includes a list of objects/chunks that may be used to reconstitute the original digital data. In addition, the partitioning can also save data that has been removed from or around a chunk for later use. This data includes information about each of the objects that made up the original file, including the various methods that were applied to the original object in the file during the chunking process, as well as the non-chunk data such as page numbers. The data can be used re-apply/restore the various transformations and data that was removed from or around the constituent chunks during the partitioning process, and to reconstruct the original file using the combination of the chunks and the non-chunk data (e.g., position-dependent, instance-dependent, and/or header/footer data that was removed from the chunks and stored separately from them).

In one set of embodiments, a method comprises: partitioning, in a data storage system, each of a plurality of instances of digital data into a respective plurality of blocks, where each instance of digital data is represented by a file identifier, the file identifier referencing each of the respective plurality of blocks; and maintaining a last-reference-check timestamp for each of the blocks within each of the pluralities of blocks such that each last-reference-check timestamp indicates a last time, if ever, the block was validated to confirm that the block was referenced within the system; maintaining a last-validation timestamp for each file identifier such that each last-validation timestamp indicates when, if ever, each block referenced by the file identifier had been validated to confirm that the file identifier referenced the respective block; removing a block from the data storage system when the last-reference-check timestamp associated with the block is earlier than the earliest last-validation timestamp in the system. In certain of these embodiments partitioning each of the plurality of instances of digital data includes: partitioning a new instance of digital data into a plurality of blocks, including a first block, generating a first file identifier based at least in part on the new digital data; associating the first file identifier with the first block and the new digital data such that the first block is referenced by the first file identifier; storing the first file identifier in the data storage system; setting the first file identifier's last-validation timestamp to the current time; storing the first block in the data storage system if the first block has not already been stored; determining if the system is currently in the process of removing unreferenced blocks; and if the system is currently in the process of removing unreferenced blocks, setting the first block's last-reference-check timestamp to the current time. In certain of these embodiments, maintaining a last-reference-check timestamp and maintaining a last-validation timestamp for each file identifier include: repeatedly performing a block reference update, the block reference update comprising: identifying the file identifier with the oldest last-validation timestamp in the data storage system as the current-file-identifier, validating each block referenced by the current-file-identifier such that each such block's last-reference-check timestamp is set to the current time; and updating the current-file-identifier's last-validation timestamp to the current time. In certain of these embodiments, each block in the storage system may exist in either a recycling bin or a primary storage bin, and where validating each block referenced by the current-file-identifier includes: if the block being validated does not exist in the primary storage bin, but does exist in the recycling bin, moving the block being validated back from the recycling bin to the primary storage bin; and if the block being validated exists neither in the primary storage bin nor the recycling bin, marking the current-file-identifier as invalid. In certain other of these embodiments, removing a block from the data storage system includes: providing an indication that unreferenced blocks are currently in the process of being removed from the storage system; removing blocks from the data storage system whose last-reference-check timestamp is earlier than the earliest last-validation timestamp; providing an indication that unreferenced blocks are no longer in the process of being removed from the storage system. In certain of these embodiments, each block may exist in either a recycling bin or a primary storage bin, and where removing all blocks from the data storage system includes: for each block in the primary storage bin whose last-reference-check timestamp is earlier than the earliest last-validation timestamp, moving the block to the recycling bin and setting the block's last-reference-check timestamp to the current time; and for each block in the recycling bin whose last-reference-check timestamp is earlier than the earliest last-validation timestamp, removing the block from the recycling bin and freeing any storage associated with the removed block. In certain of these such embodiments, an instance of digital data is further partitioned into respective additional data, where a combination of the respective plurality of blocks and additional data together represent all of the digital data of the instance, the additional data including at least one of position-dependent data, instance-dependent data, format-specific headers or footers, and format-specific transformations. In certain of these embodiments, maintaining a last-reference-check timestamp for each of the blocks, maintaining a last-validation timestamp for each file identifier, and removing a block from the data storage system are performed concurrently.

In yet another set of embodiments a method comprises: partitioning, in a data storage system, digital data into a plurality of blocks, including a first block, where each of the plurality of blocks has a last-reference-check timestamp, the last-reference-check timestamp indicating the last time, if ever, the block was validated to confirm that the block was referenced within the system; generating a file identifier based at least in part on the digital data, where the file identifier has a last-validation timestamp, the last-validation timestamp indicating when, if ever, any blocks associated with the file identifier were validated; associating the file identifier with the first block and the digital data such that the first block is referenced by the file identifier; storing the file identifier in a storage system; setting the file identifier's last-validation timestamp to the current time; storing the first block in the storage system if the first block has not already been stored; determining if the system is currently in the process of removing unreferenced blocks; and if the system is currently in the process of removing unreferenced blocks, setting the first block's last-reference-check timestamp to the current time. In some such embodiments, the digital data is further partitioned into additional data, where a combination of the plurality of blocks and the additional data together represent all of the digital data, and the additional data includes at least one of position-dependent data, instance-dependent data, format-specific headers or footers, and format-specific transformations.

In another set of embodiments, a method comprises: partitioning, in a data storage system, each of a plurality of instances of digital data into a respective plurality of blocks, where each instance of digital data is represented by a file identifier, the file identifier referencing each the respective plurality of blocks, and where each of the blocks in the system has a last-reference-check timestamp, the last-reference-check timestamp indicating the last time, if ever, the block was validated to confirm that the block was referenced by at least one file identifier within the system, and where each file identifier has a last-validation timestamp, the last-validation timestamp indicating when, if ever, blocks referenced by the file identifier were validated; repeatedly performing a block reference update, the block reference update comprising: identifying the file identifier with the oldest last-validation timestamp in the data storage system as the current-file-identifier, validating each block referenced by the current-file-identifier such that each such block's last-reference-check timestamp is set to the current time; and updating the current-file-identifier's last-validation timestamp to the current time. In some such embodiments each block in the storage system may exist in either a recycling bin or a primary storage bin, and validating each block referenced by the current-file-identifier includes: if the block being validated does not exist in the primary storage bin, but does exist in the recycling bin, moving the block being validated back from the recycling bin to the primary storage bin; if the block being validated exists neither in the primary storage bin nor the recycling bin, marking the file identifier as invalid. In some such embodiments each instance of digital data is further partitioned into respective additional data, where a combination of the respective plurality of blocks and additional data together represent all of the digital data of the instance, the additional data including at least one of position-dependent data, instance-dependent data, format-specific headers or footers, and format-specific transformations.

In still another set of embodiments, a method comprises: partitioning, in a data storage system, each of a plurality of instances of digital data into a respective plurality of blocks, where each instance of digital data is represented by a file identifier, the file identifier referencing each the respective plurality of blocks, and where each of the blocks in the system has a last-reference-check timestamp, the last-reference-check timestamp indicating the last time, if ever, the block was validated to confirm that the block was referenced by at least one file identifier within the system, and where each file identifier has a last-validation timestamp, the last-validation timestamp indicating when, if ever, blocks referenced by the file identifier were validated; providing an indication that unreferenced blocks are currently in the process of being removed from the storage system; removing all blocks from the data storage system whose last-reference-check timestamp is earlier than the earliest last-validation timestamp; providing an indication that unreferenced blocks are no longer in the process of being removed from the storage system. In some such embodiments, each block may exist in either a recycling bin or a primary storage bin, and removing all blocks from the data storage system includes: for each block in the primary storage bin whose last-reference-check timestamp is earlier than the earliest last-validation timestamp, moving the block to the recycling bin and setting the block's last-reference-check timestamp to the current time; and for each block in the recycling bin whose last-reference-check timestamp is earlier than the earliest last-validation timestamp, removing the block from the recycling bin and freeing any storage associated with the removed block. In other such embodiments, each instance of digital data is further partitioned into respective additional data, where a combination of the respective plurality of blocks and additional data together represent all of the digital data of the instance, the additional data including at least one of position-dependent data, instance-dependent data, format-specific headers or footers, and format-specific transformations.

DESCRIPTION OF EXAMPLE EMBODIMENTS

A data de-duplication system can have the following basic components:
a) one or more chunking algorithms or subsystems that analyze data streams and chunk them into blocks;
b) one or more repositories in which data for blocks is stored; and
c) one or more metadata repositories that store metadata, including the interrelationships of files, file identifiers such as file checksums, and the block units comprising the file and file checksums.

The following factors have hindered the scalability of the data de-duplication systems:
a) ensuring integrity of the entire system; and
b) distributing the metadata and data repositories across multiple instances or machines without compromising the integrity of the system.

Ensuring the Integrity of a Data De-Duplication System

An advantage of data de-duplication systems is that they need to store only one copy of each unique block of data. While storing one copy of each block yields storage efficiency, it can place several requirements on data de-duplication systems. The system may have to:
a) ensure that the inter-relationship of files and the blocks that make up the file is accurate at all times;
b) ensure that a block cannot be removed from the data de-duplication system while a file in the system is dependent on that block; and
c) ensure the safety and integrity of the data of each block.

These conditions are desired because, if even a single block is inaccessible, the entire data de-duplication system may become unusable.

Additionally, the following operating environment constraints, in which most data de-duplication systems operate, should be considered:
a) the data de-duplication system should be always online;
b) the data de-duplication system should be able to manage billions of data blocks that are referenced by millions of files; and
c) every day, millions of blocks could get added or deleted from the data de-duplication systems Ensuring that a block of data is not referenced by any file in a live system can be a challenge. In a live system that is receiving information regarding thousands of blocks per second, a block's reference information can change at any given time.

Traditional Systems

Traditional systems handle this problem by adopting the following measures:
a) Maintain reference counts for each block to keep track of the number of files that are referring to a given block. When a file is added to, or deleted from, the system, the system updates the reference counts for those blocks. This approach can cause several scalability and integrity issues:
1. Every time a file gets added or deleted, the reference count must be updated in a metadata repository, requiring two repository operations: read the current value, and then write the new value. Additionally, if multiple threads are active in the system, synchronization overhead is required, which slows down the entire system.

2. If the system crashes in the middle of a reference count update, integrity issues can arise. To protect against that, systems typically incur the overhead of database transactions, which further slow down the system.
3. The overhead associated with reference count updates is incurred during the peak usage of the system, which further causes issues.

b) Take the system offline to prevent any changes to the system, to validate the integrity of the system, and to find blocks that may be candidates for removal. Typically, after the system is taken offline, the entire metadata repository is traversed to ensure that inter-relationship of files, and the blocks that make up the files, is accurate for all files and blocks in the system. This can cause several scalability and availability problems:

1. the system becomes unavailable periodically, thereby lowering business productivity; and
2. as the size of the system grows, the amount of time the system must be down becomes larger and larger—effectively putting a limit on the maximum size of the data de-duplication system—determined by the time requirement of the system to be offline and the maximum downtime allowed by business objectives of the system.

Another problem with traditional systems is that while they can detect an integrity problem, they are typically unable to fix it by themselves. This inability can increase the cost of management of such systems if additional safeguards have to be built around those systems to help them recover from any integrity issues.

Traditional Method of Removing Unreferenced Blocks from Data De-Duplication System Traditional data storage systems may organize the chunked digital data they store into several levels of hierarchical components, each of which represent and/or store different elements of the digital data.

FIG. 1 illustrates one such organization of a chunked representation of digital data. The organizing components include the following three structure types:

BlockCheckSum ("BCS"): each file is broken into one or more smaller blocks using one or more chunking approaches specific to the data de-duplication repository. A checksum is computed for each block. This checksum is referred to as a BlockCheckSum, and may be used to reference the block.

FileCheckSum ("FCS"): for each file a checksum is computed for the entire file. This FileCheckSum is stored with the backup catalog of each file. The FileCheckSum may be considered a type of file identifier that represents the file as it is stored in the repository.

BlockMap: each FileCheckSum has a block map which keeps track of the interrelationships between the file and the blocks it is comprised of.

Mapping a File to FileCheckSum and BlockCheckSum Components

Still referring to FIG. 1, every file in the catalog contains a pointer to the FileCheckSum representing the contents of that file. Each FileCheckSum can optionally have a reference count equal to number of files this checksum is being referenced by.

Each FileCheckSum as explained above has a BlockMap which contains the list of BlockCheckSums that comprise that particular FileCheckSum. Each BlockCheckSum maintains a reference count which is equal to the number of times it is being referenced inside all the BlockMaps.

The FileCheckSum is not deleted until the reference count associated with it is zero; i.e., there is no file is referring to it.

Similarly a BlockCheckSum is not deleted until the reference count associated with it is zero; i.e., no FileCheckSum is referring to it.

A Highly Scalable, Reliable and Available Data De-Duplication System

A scalable, reliable, and available data de-duplication system is described, which can have the following attributes:

a) performs highly reliable and efficient online integrity testing, ensuring that the system is not taken offline for regular integrity checks;
b) does not need to maintain expensive and error-prone reference counts;
c) is a self-healing system which can detect and address integrity issues on its own; and
d) is highly scalable across multiple distributed machines without compromising integrity.

Online Integrity Testing Without Maintaining Reference Counts

Embodiments that can identify unreferenced blocks, without relying on reference counts, are described here. One aspect of these embodiments include adding the following attributes to the metadata repository of a storage system:

1. each FileCheckSum has an additional attribute: "LastFCSValidationTime"; and
2. each BlockCheckSum has an additional attribute: "LastBlockExistCheckTime".

Additionally, two block metadata storage containers are defined:

1. The BlockCheckSums currently in use are kept in the "BlocksContainer".
2. A new container "RecycleBinForBlocks" which keeps all the BlockCheckSums which the system determines are ready to be deleted.

Based on the above additional attributes and the new metadata storage containers, the following embodiments are used for identifying and then removing unreferenced blocks from the data de-duplication system. The embodiments below are designed to be:

1) Online: run while the system is online
2) Restartable: there is no requirement for these embodiments to complete the integrity check pass on the entire data set in a single run. They can start, then stop, and then restart, from the point where they left off without compromising the integrity of the data.
3) Continuously running or be only running at scheduled intervals: these embodiments are designed to be running either continuously or only at scheduled intervals, say in non-peak hours. Because they are restartable, interrupting a run does not affect the system at all.

The embodiments consist of three primary processes, any combination of which may be running at a given time in a data storage system. One process concerns removing unreferenced blocks, and specifically unreferenced BlockCheckSums. A second process is associated with how to add new digital data to the storage system. This involves adding a new FileCheckSum while ensuring that any concurrently-running block removal process does not interfere with the addition of the blocks associated with the new FileCheckSum and vice versa. A third process, also runnable at any time with respect to the other two processes, is concerned with maintaining timestamps within the system to accommodate the needs of the block removal process and with maintaining referential integrity.

Method for Adding a New FileCheckSum

1. Add the new FileCheckSum with "LastFCSValidationTime" as current time

2. If the global state of "RemoveUnreferenceBlockInProgress" is true, then for each block in the BlockMap, update the "LastBlockExistCheckTime" to current time.

Figure 4:
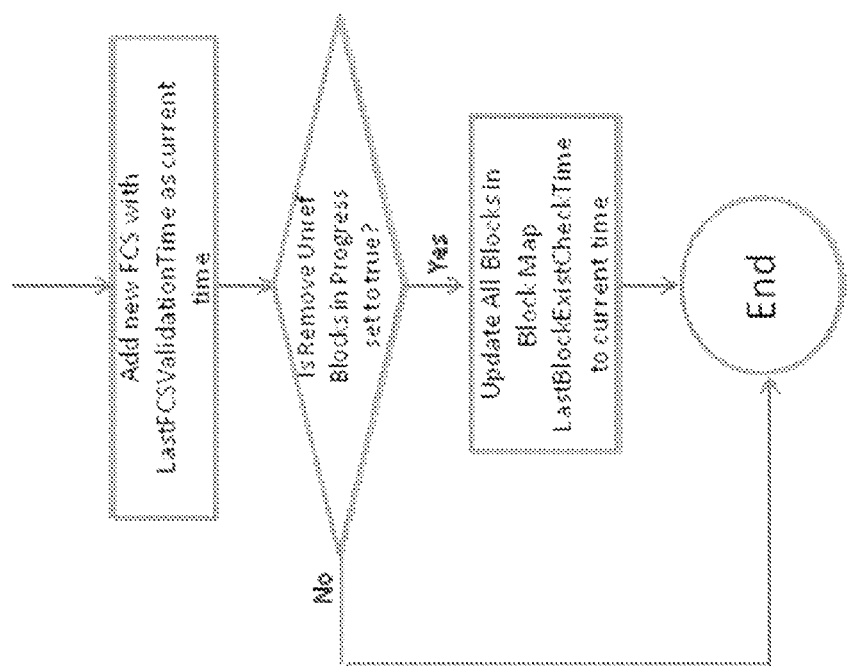
FIG. 4 illustrates a method for adding a new file check sum in a data de-duplication system in a manner that does not rely upon reference counts of blocks in accordance with some embodiments.

FIG. 4 provides more details on a method for adding a new file check sum.

Figure 2:
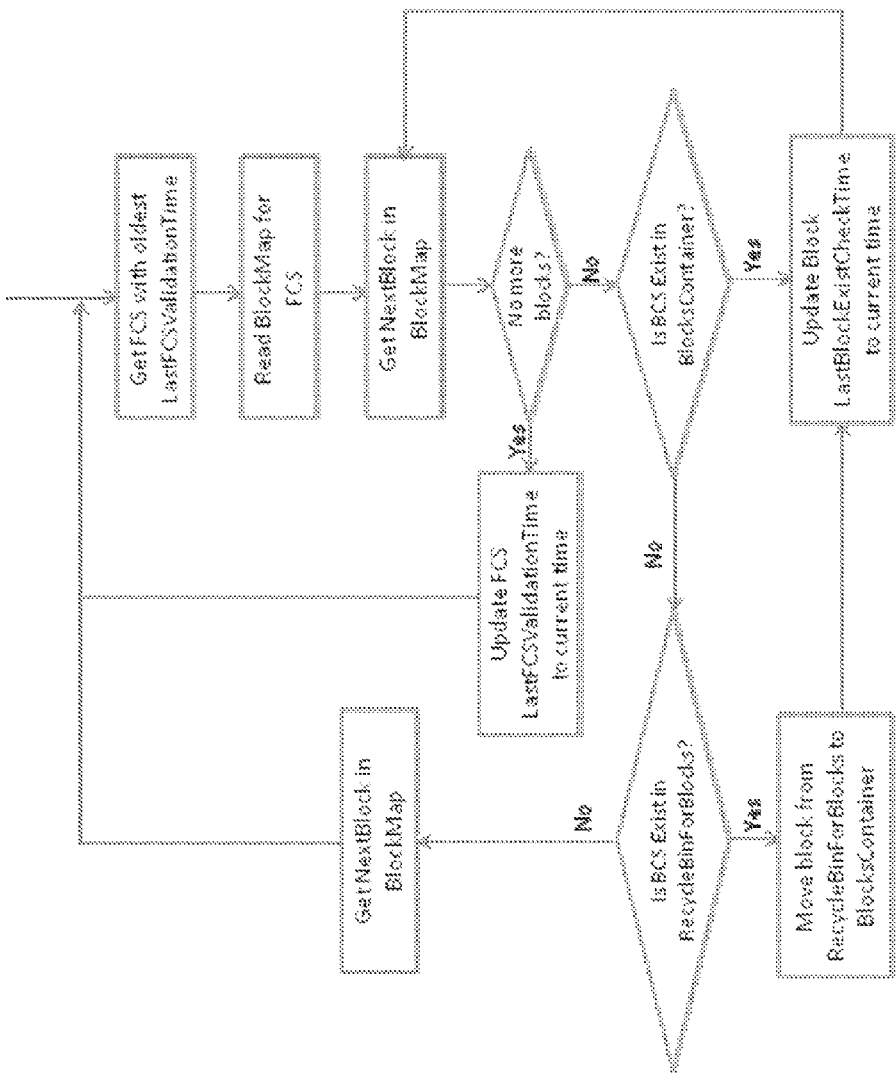
FIG. 2 illustrates a method for updating block existence times to support removing unreferenced blocks from a data de-duplication system in a manner that does not rely upon reference counts of blocks in accordance with some embodiments.

Method for Updating the Block Existence Time
1. Get the FileCheckSum entry with oldest "LastFCSValidationTime"
2. Read the BlockMap of the FileCheckSum
3. For each BlockCheckSum entry in the BlockMap, validate and update the "LastBlockExistCheckTime" to current time
   a. If the BlockCheckSum is not present in "BlocksContainer", then move it back from "RecycleBinForBlocks" if present.
   b. If the BlockCheckSum is not present in the system and not present in the "RecycleBinForBlocks" container, then mark the FileCheckSum invalid.
4. Update "LastFCSValidationTime" of the FileCheckSum to be the current time
5. Keep repeat step 1 for the next FileCheckSum FIG. 2 provides more details on the method for updating the block existence time during non peak hours.

Figure 3:
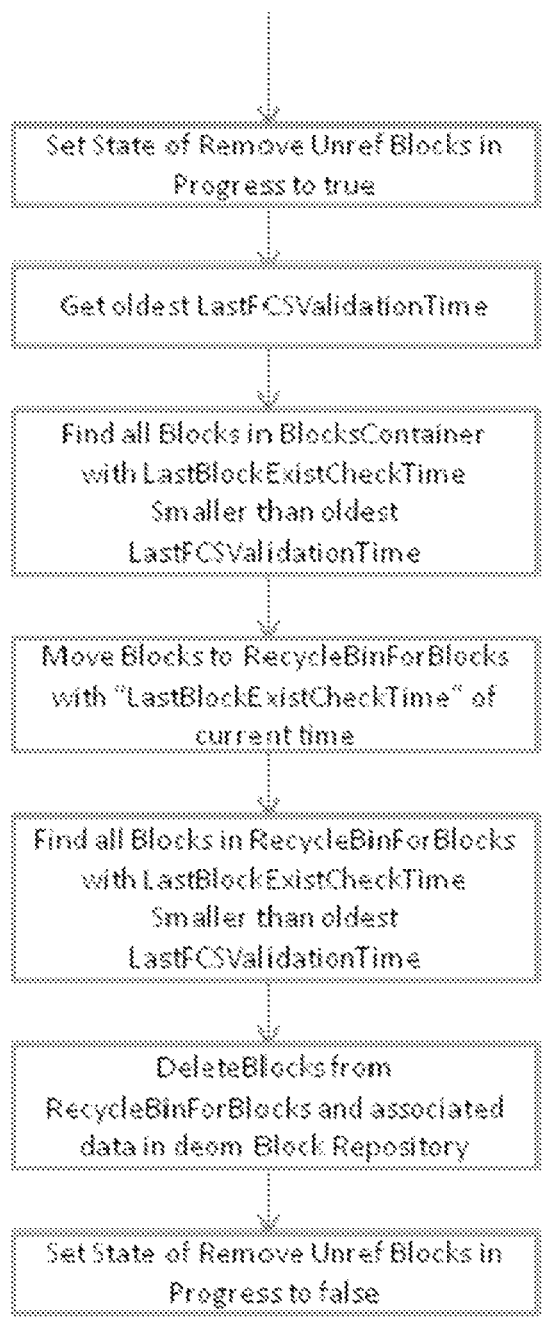
FIG. 3 illustrates a method for removing unreferenced blocks from a data de-duplication system in a manner that does not rely upon reference counts of blocks in accordance with some embodiments.

Method for Removing Unreferenced Blocks
1. Set global state of "RemoveUnreferenceBlockInProgress" to true
2. Get the oldest "LastFCSValidationTime" from FileCheckSum (which will be referred to here as the "OldestLastFCSValidationTime")
3. Remove Unreferenced Blocks from "BlocksContainer":
   a. Find all BlockCheckSums from "BlocksContainer" for which the value "LastBlockExistCheckTime" is earlier than "OldestLastFCSValidationTime". This list is the list of all Blocks which are not referenced in any of the FileCheckSum (see method for adding a new FileCheckSum).
   b. For each such Block found, remove it from the "BlocksContainer" and add it to "RecycleBinForBlocks" with "LastBlockExistCheckTime" set to the current time.
4. Remove Unreferenced Blocks from "RecycleBinForBlocks":
   a. Find all BlockCheckSum from "RecycleBinForBlocks" which the value "LastBlockExistCheckTime" is earlier than "OldestLastFCSValidationTime". This list is the list of all Blocks which are not referenced in any of the FileCheckSum (see method for adding a new FileCheckSum)
   b. For each Block found, remove it from the "RecycleBinForBlocks" and free its associated block data.
5. Set global state of "RemoveUnreferenceBlockInProgress" to false FIG. 3 provides more details on a method for removing unreferenced blocks during non-peak hours.

The above method of removing unreferenced blocks from the data de-duplication system has one or more of the following benefits:
1. The entire data de-duplication system is not locked down for performing integrity testing before removing the unreferenced blocks.
2. For most time (excluding time when remove unreferenced blocks in progress), adding a new file checksum does not require any updates of associated blocks, thus reducing the time to insert a new file.
3. The process for removing unreferenced blocks can be done during non-peak hours without affecting the peak load.

Self-Healing System

Once a data de-duplication system has detected that there is an integrity issue, it should try to fix itself automatically. The following integrity issues are possible:
 a) The inter-relationship of one or more files, and the blocks that make up the file, becomes inaccurate in the metadata repository.
 b) One or more blocks get deleted from the data de-duplication system metadata repository, while one or more files in the system are still dependent on those blocks.
 c) The data for one or more blocks gets deleted from the system while the metadata repository still has files and blocks dependent on that data.

A highly reliable system should be able to detect the above issues and should have taken measures beforehand to ensure that it can fix these issues automatically.

Distributed Block Data and Metadata

A new system is described for intelligently distributing the metadata and block data for the centralized metadata and data repositories inherent in a data de-duplication system. The distribution is done by leveraging nodes of which one or more of them are already expected to be present in the system:
 a) Cache node metadata and block data repositories: several storage and backup systems create cache servers at remote sites to enable faster access to the data by not requiring WAN access for every data request. A remote cache server associated with the data de-duplication system hosts a cache that has metadata and block data repositories for faster access.
 b) Single client metadata and block data repositories: clients accessing or storing data on the data de-duplication system can many times store local copies of metadata and block data repositories specific to their computer.
 c) High availability node metadata and block data repositories: a high availability system can store either all or a subset of metadata and block data repository on the data de-duplication system.
 d) Disaster recovery node metadata and block data repositories: a disaster recovery copy of the data de-duplication system can store either all or a subset of metadata and block data repository on the data de-duplication system.

A reliable and self-healing system can influence and leverage these distributed copies of metadata and block data repositories to ensure that multiple copies of the metadata and data associated with each file, FileCheckSum, and BlockCheckSum are available in a system at a given time. The key attributes are:
 a) The system keeps track of how many copies are available for each metadata and data associated with each file, FileCheckSum, and BlockCheckSum.
 b) The system keeps track of the importance of each metadata and data associated with each file, FileCheckSum, and BlockCheckSum based on a scorecard that is generated by using several factors like: number of times a block is referred, number of times a file has been referred.
 c) The system also assigns a quality of access scorecard to each source based on the link speed, availability of the source, etc.

The data de-duplication system can be implemented in hardware and/or software, including a special purpose processor, general purpose processor, or combination thereof. The processor can execute software programs stored in computer readable media and executed by a processor. The system for maintaining data can include one or more databases, and/or other suitable memory, including optical, magnetic, or solid state.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims. For example, the described methods for removing unreferenced blocks could be implemented in data storage systems such as generalized databases in addition to backup systems, or within systems storing digital data in forms other than as files.

What is claimed is:

1. A method comprising:
 maintaining, in a data storage system, a plurality of blocks of data, the storage system representing a plurality of sets of digital data, by associating each of said sets of digital data with at least one of said plurality of blocks;
 maintaining a first timestamp corresponding to each of the plurality of blocks, the first timestamp indicating a last time when a block was verified to have been associated with at least one of said sets of digital data;
 maintaining a second timestamp corresponding to each of the sets of digital data, the second timestamp indicating a time when an association between a set of digital data and at least one of said plurality of blocks was verified;
 providing an indication that a given block that is not associated with any of the sets of digital data is in the process of being removed from the storage system, wherein the first timestamp associated with the block indicates an earlier time than each of the second timestamps;
 deleting the given block of data from the storage system; and
 providing an indication that the block has been removed from the storage system.

2. The method of claim 1, comprising:
 maintaining a further plurality of blocks corresponding to a further set of digital data;
 associating the further set of digital data with a further block of the further plurality of blocks;
 setting a second timestamp associated with the further set of digital data to a current time;
 determining if said further block does not correspond to any of the plurality of data blocks; and
 in dependence on said determination, storing said further block and setting a first timestamp associated with said further block to the current time.

3. The method of claim 1, comprising:
 identifying a set of digital data with an earliest second timestamp in the data storage system;
 validating an association between the set of digital data and each of the plurality of blocks associated therewith and setting the first timestamp associated with each of the plurality of blocks in dependence on said verification to the current time; and
 updating the second timestamp associated with the set of digital data to the current time.

4. The method of claim 3, wherein each of said plurality of blocks is maintained in a first storage area or a second, different storage area, the method comprising:
 if a block being validated is maintained on the second storage area, moving the block being validated from the second storage area to the first storage area; and
 if the block being validated cannot be located on the first storage area and the second storage area, marking the set of digital data associated therewith as invalid.

5. The method of claim 4, comprising:
 for each of the blocks maintained on the first storage area:
  comparing the first timestamp associated therewith each of the second timestamps,
  moving the block to the second storage area in dependence on said comparison, and
  setting the first timestamp associated with the block to the current time; and
 for each of the blocks maintained on the second storage area:
  comparing the first timestamp associated therewith each of the second timestamps, and
  removing the block from the second storage area in dependence on said comparison.

6. The method of claim 1, wherein each said set of digital data is associated with at least one of a position-dependent data, an instance-dependent data, a format-specific header, a footer, and format-specific data.

7. A system comprising:
 a memory configured to store data; and
 a processor configured to:
  maintain, in the memory, a plurality of blocks of data, the memory representing a plurality of sets of digital data, by associating each of said sets of digital data with at least one of said plurality of blocks;
  maintain a first timestamp corresponding to each of the plurality of blocks, the first timestamp indicating a time when a block was verified to have been associated with at least one of said sets of digital data;
  maintain a second timestamp corresponding to each of the sets of digital data, the second timestamp indicating a time when an association between a set of digital data and at least one of said plurality of blocks was verified;
  provide an indication that a given block that is not associated with any of the sets of digital data is in the process of being removed from a storage system, wherein the first timestamp associated with the block indicates an earlier time than each of the second timestamps;
  delete the given block of data from the storage system; and
  provide an indication that the block has been removed from the storage system.

8. The system of claim 7, wherein the processor is further configured to:
 maintain a further plurality of blocks corresponding to a further set of digital data;
 associate the further set of digital data with a further block;
 set a second timestamp associated with the further set of digital data to a current time;
 determine if said further block does not correspond to any of the plurality of data blocks; and
 in dependence on said determination, store said further block and set a first timestamp associated with said further block to the current time.

9. The system of claim 7, wherein the processor is further configured to:
 identify a set of digital data with an earliest second timestamp in the data storage system;
 validate an association between the set of digital data and each of the plurality of blocks associated therewith and set the first timestamp associated with each of the plurality of blocks in dependence on said verification to a current time; and
 update the second timestamp associated with the set of digital data to the current time.

10. The system of claim 9, wherein each of said plurality of blocks is maintained in a first storage area or a second, different storage area, and the processor is further configured to:
- if a block being validated is maintained on the second storage area, move the block being validated back from the second storage area to the first storage; and
- if the block being validated cannot be located on the first storage area or the second storage area, mark the set of digital data associated therewith as invalid.

11. The system of claim 10, wherein the processor is further configured to:
- for each of the blocks maintained on the first storage area:
  - compare the first timestamp associated therewith each of the second timestamps,
  - move the block to the second storage area in dependence on said comparison,
  - set the first timestamp associated with the block to the current time; and
- for each of the blocks maintained on the second storage area:
- compare the first timestamp associated therewith each of the second timestamps; and
- remove the block from the second storage area in dependence on said comparison.

12. The system of claim 7, wherein the processor is configured to associate each said set of digital data with at least one of a position-dependent data, an instance-dependent data, a format-specific header or a footer, and format-specific data.

13. A non-transitory computer readable storage medium storing computer readable instructions thereon, the computer readable instructions when executed by a processor of a computing device cause the processor to perform a method comprising:
- maintaining, in a data storage system, a plurality of blocks of data, the storage system representing a plurality of sets of digital data, by associating each of said sets of digital data with at least one of said plurality of blocks;
- maintaining a first timestamp corresponding to each of the plurality of blocks, the first timestamp indicating a time when a block was verified to have been associated with at least one of said sets of digital data;
- maintaining a second timestamp corresponding to each of the sets of digital data, the second timestamp indicating a time when an association between a set of digital data and at least one of said plurality of blocks of data was verified;
- providing an indication that a given block that is not associated with any of the sets of digital data is in the process of being removed from the storage system, wherein the first timestamp associated with the block indicates an earlier time than each of the second timestamps;
- deleting the given block of data from the storage system; and
- providing an indication that the block has been removed from the storage system.

14. The non-transitory computer readable storage medium of claim 13, wherein the computer readable instructions cause the processor to:
- maintain a further plurality of blocks corresponding to a further set of digital data;
- associate the further set of digital data with a further block;
- set a second timestamp associated with the further set of digital data to a current time;
- determine if said further block does not correspond to any of the plurality of data blocks; and
- in dependence on said determination, store said further block and set a first timestamp associated with the further block to the current time.

15. The non-transitory computer readable storage medium of claim 13, wherein the computer readable instructions cause the processor to:
- identify a set of digital data with an earliest second timestamp in the data storage system;
- validate an association between the set of digital data and each of the plurality of blocks associated therewith and set the first timestamp associated with each of the plurality of blocks in dependence on said verification to a current time; and
- update the second timestamp associated with the set of digital data to the current time.

16. The non-transitory computer readable storage medium of claim 15, wherein each of said plurality of blocks is maintained in a first storage area or a second, different storage area, and the computer readable instructions cause the processor to:
- if a block being validated is maintained on the second storage area, move the block being validated back from the second storage area to the first storage area; and
- if the block being validated cannot be located on the first storage area or the second storage area, mark the set of digital data associated therewith as invalid.

17. The non-transitory computer readable storage medium of claim 16, wherein the computer readable instructions cause the processor to:
- for each of the blocks maintained on the first storage area:
  - compare the first timestamp associated therewith each of the second timestamps,
  - move the block to the second storage area in dependence on said comparison, and
  - set the first timestamp associated with the block to the current time; and for each of the blocks maintained on the second storage area:
  - compare the first timestamp associated therewith each of the second timestamps, and
- remove the block from the second storage area in dependence on said comparison.

18. The non-transitory computer readable storage medium of claim 13, wherein the computer readable instructions cause the processor to associate each said set of digital data with at least one of a position-dependent data, an instance-dependent data, a format-specific header, a footer, and format-specific data.

* * * * *